(12) United States Patent
Kumar et al.

(10) Patent No.: US 9,813,504 B2
(45) Date of Patent: Nov. 7, 2017

(54) VIRTUALIZING DEVICE MANAGEMENT SERVICES ON A MULTI-SESSION PLATFORM

(71) Applicant: Citrix Systems, Inc., Fort Lauderdale, FL (US)

(72) Inventors: Sandeep Kumar, Cupertino, CA (US); Terry N. Treder, Delray Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 262 days.

(21) Appl. No.: 14/816,800

(22) Filed: Aug. 3, 2015

(65) Prior Publication Data
US 2017/0041398 A1 Feb. 9, 2017

(51) Int. Cl.
*H04L 29/08* (2006.01)
*G06F 9/54* (2006.01)

(52) U.S. Cl.
CPC .............. *H04L 67/14* (2013.01); *G06F 9/54* (2013.01)

(58) Field of Classification Search
None
See application file for complete search history.

(56) References Cited

U.S. PATENT DOCUMENTS

| 2012/0331032 A1* | 12/2012 | Balachandran | H04L 69/164 709/202 |
| 2013/0111561 A1* | 5/2013 | Kaushik | H04L 63/105 726/4 |
| 2016/0036818 A1* | 2/2016 | Patesaria | H04L 63/104 726/3 |
| 2016/0125052 A1* | 5/2016 | Dahan | G06F 17/30566 707/705 |

* cited by examiner

*Primary Examiner* — Natisha Cox
(74) *Attorney, Agent, or Firm* — Banner & Witcoff, Ltd.

(57) ABSTRACT

Methods, systems, computer-readable media, and apparatuses may provide virtualization of device management services (e.g., device drivers) dedicated managing a particular device and designed under for or under the assumption the particular device and the device management service will be utilized in a single session/user environment, so that virtual instances of the device management services may be used in a multi-session environment. Further, a redirection and/or virtualization layer may be created for each session in the multi-session environment to perform global database redirection, object name translation, and file system translation to ensure session boundaries are maintained and global/shared resources are not inappropriately altered by a session. As an example, the redirection/virtualization layer may redirect communications associated with a session and for a global resource to access a virtual instance of the resource specific to the session.

20 Claims, 8 Drawing Sheets

VIRTUALIZING DEVICE MANAGEMENT SERVICES ON A MULTI-SESSION PLATFORM

FIELD

Aspects of the disclosure relate to computer hardware and software. In particular, one or more aspects of the disclosure generally relate to computer hardware and software for virtualization and management of services (e.g., device drivers) designed for a single session environment and dedicated to managing a device so that the services may be used in single operating system, multiple session environments.

BACKGROUND

With the advent of virtualization of multiple session environments, virtual service providers face compatibility issues for computing devices that work in tandem with device management services (e.g., device drivers) designed with a single workstation mindset. Device management services control computing devices' access to various applications. By having a single operating system service multiple sessions in a virtual environment, computing devices, which have been designed assuming that a single operating system will service a single session, might not work when multiple sessions attempt to interact with the computing device or its device management services. In a single operating system, multi-session environment, the device management services residing at the server might not be able to access the computing device to control or manage the computing device in a specific session. Further, if the device management services are able to access these computing devices, use of the device management services creates conflicts between the different sessions since each session is writing to and reading from the same system resources without regard for the other sessions, which may lead the computing devices to stop working and/or cause incorrect outputs to users. While, in many cases, the computing device may be USB-based devices connected as a peripheral to the user's computer (e.g., a smartcard and smartcard reader), in other cases, the computing device may be a standalone device such as a drawing-enabled tablet that has its own device management service.

Current "solutions" involve costly modifications to the virtual architecture. Particularly, a virtual machine is created for each session/user with each virtual machine having a separate image of the entire operating system, associated databases (e.g., a registry), and a separate allocation of server resources (e.g., memory). However, creating a separate virtual machine including a separate image of the entire operating system results in use of a vast amount of disk space and much greater maintenance and management costs.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure address one or more issues described above by disclosing methods, computer readable media, software systems, and apparatuses for providing virtualization of device management services (e.g., device drivers) dedicated managing a particular device and designed under for or under the assumption the particular device and the device management service will be utilized in a single session/user environment, so that virtual instances of the device management services may be used in a multi-session environment. Further, a redirection and/or virtualization layer may be created for each session in the multi-session environment to perform global database redirection, object name translation, and file system translation to ensure session boundaries are maintained and global/shared resources are not inappropriately altered by a session. As an example, the redirection/virtualization layer may redirect communications associated with a session and for a global resource to access a virtual instance of the resource specific to the session. As another example, the redirection/virtualization layer may redirect communications associated with a session and for a location of a global database to a location of a session-specific database that corresponds to the location of the global database. As yet another example, the redirection/virtualization layer may replace global object names in communications associated with the session with session-specific object names (e.g., to access a virtual instance of global object where the virtual instance is specific to the session).

In some embodiments, a system may include a first computing device and a second computing device communicatively coupled to the first computing device via a wide area network. The first computing device may be configured to provide a virtual environment including multiple sessions. Each session may be specific to a different user and include at least one virtual instance of an application executed by the first computing device. The second computing device may be associated with a session and configured to interact with a virtual instance of the application specific to the session. The second computing device may be communicatively coupled to a service managed device that is configured to be managed by a device management service. The session may include a virtual instance of the device management service for use with the session and a redirection layer for use with the session. The redirection layer may be configured to intercept a communication between the virtual instance of the application specific to the session and the virtual instance of the device management service for use with the session.

In some embodiments, an apparatus may include a processor and a computer readable medium storing instructions that, when executed by the processor, configure the apparatus to perform a number of steps. For instance, the apparatus may generate multiple sessions where each session is specific to a different user and includes at least one virtual instance of an application. The apparatus may perform one or more functions of a virtual instance of the application for a session based on one or more user inputs received from a user device different from the apparatus. The apparatus may determine whether the user device is connected to a peripheral device configured to be managed by a device driver. The apparatus may, in response to determining that the user device is connected to the peripheral device configured to be managed by the device driver, generate a virtual instance of the device driver for the session and a redirection layer for the virtual instance of the device driver for the session.

In some embodiments, a method may include generating, by a computing device, multiple sessions where each session is specific to a different user and includes at least one virtual instance of an application. Further, the computing device may perform one or more functions of a virtual instance of the application for a session based on one or more user inputs received from a user device different from the computing device. The computing device may, in response to determining that the user device is connected to a peripheral device configured to be managed by a device driver, generate a virtual instance of the device driver for the session and a redirection layer for the virtual instance of the device driver for the session. The computing device may reroute messages associated with a session and intended for a global resource to a virtual instance of the global resource that is specific to the session.

These features, along with many others, are discussed in greater detail below.

BRIEF DESCRIPTION OF THE DRAWINGS

The present disclosure is illustrated by way of example and not limited in the accompanying drawings in which like reference numerals indicate similar elements and in which.

DETAILED DESCRIPTION

As a general introduction to the subject matter described in more detail below, aspects described herein are directed towards virtualization and management of services dedicated to managing devices either designed for or under the assumption that the devices and their management services will be utilized in a single user environment. By virtualizing these services and creating multiple instances of such services, such devices may be used and managed by its virtualized services in a multi-user environment.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
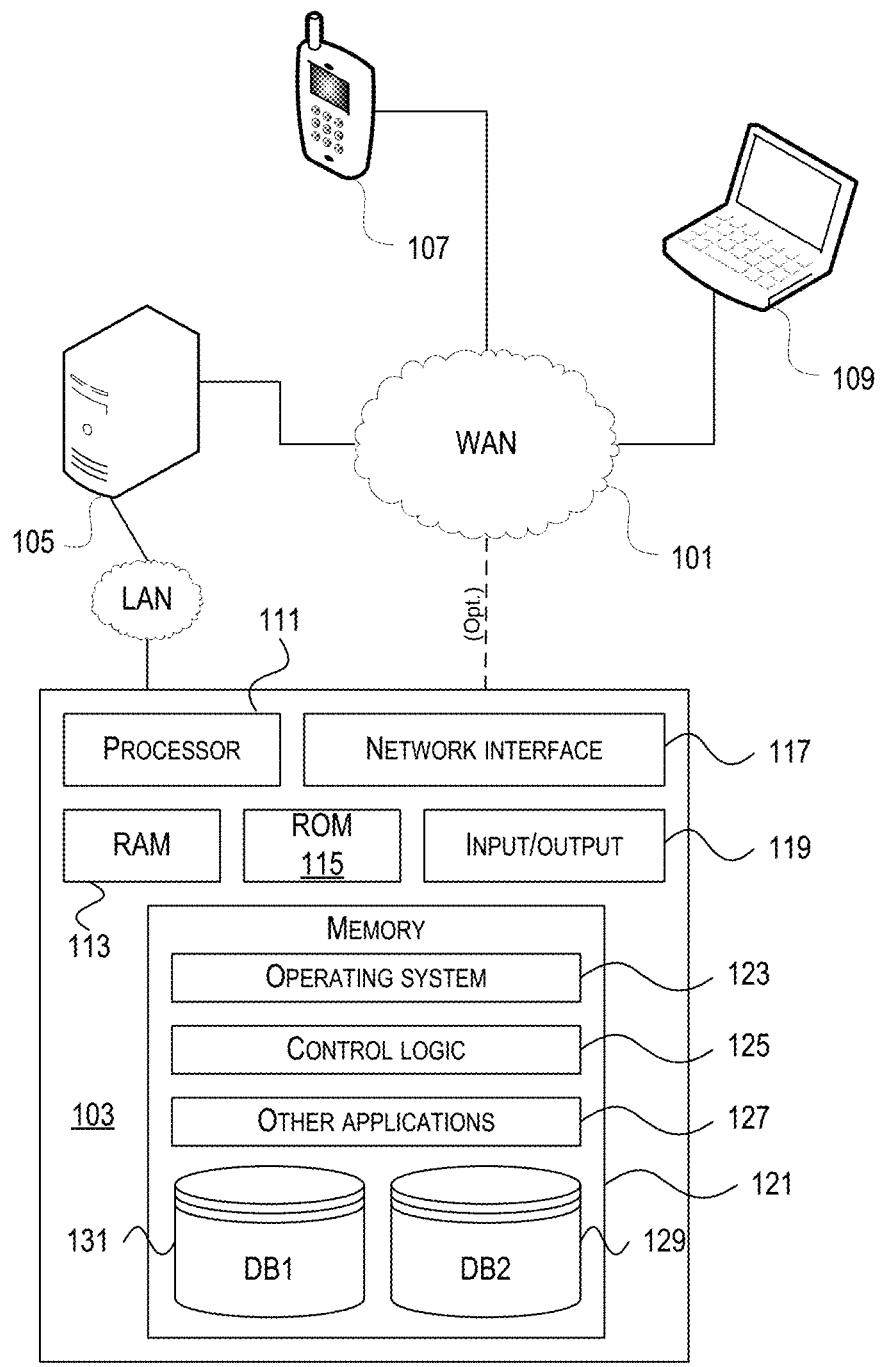
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 131 and a second database 129. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
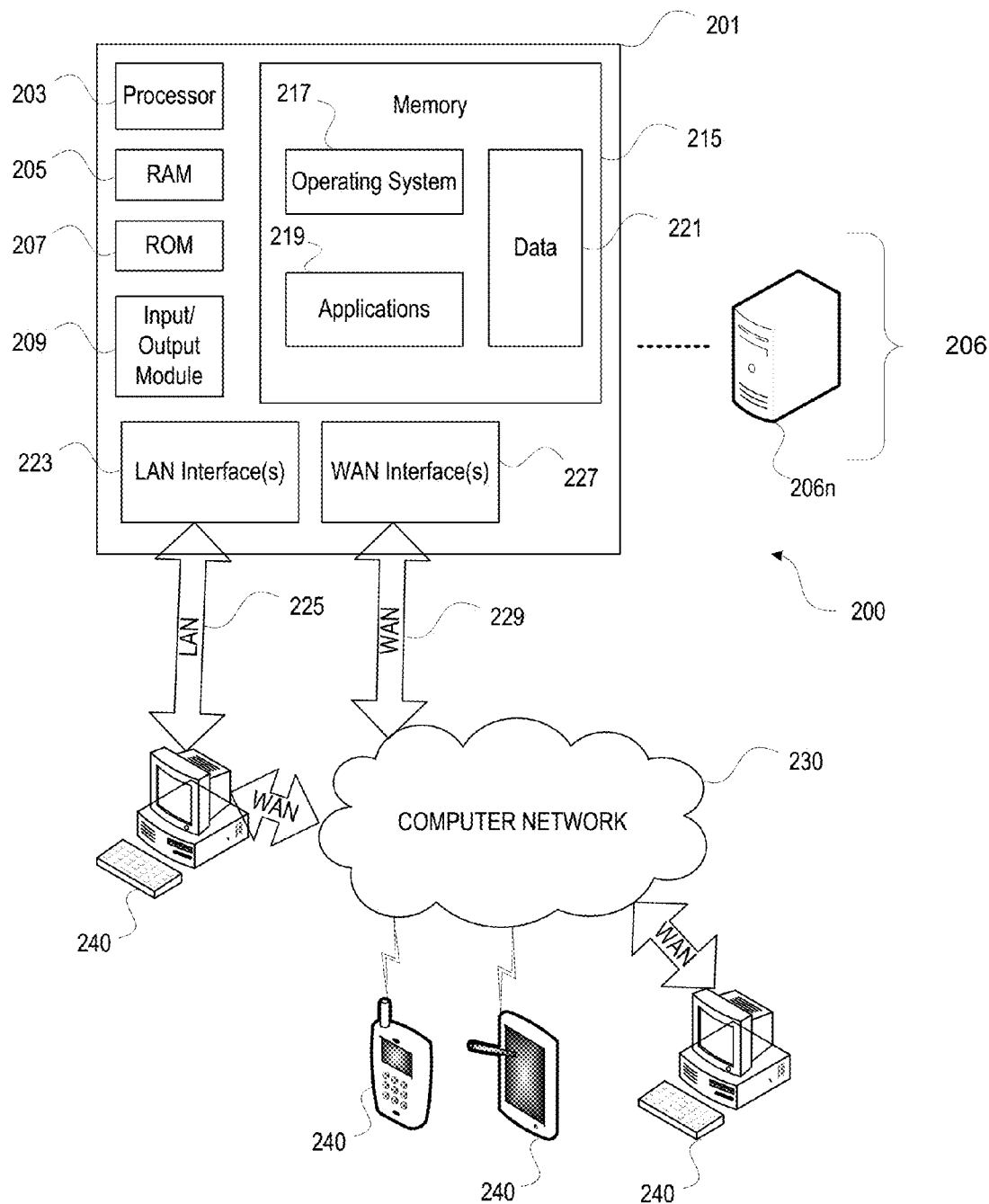
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
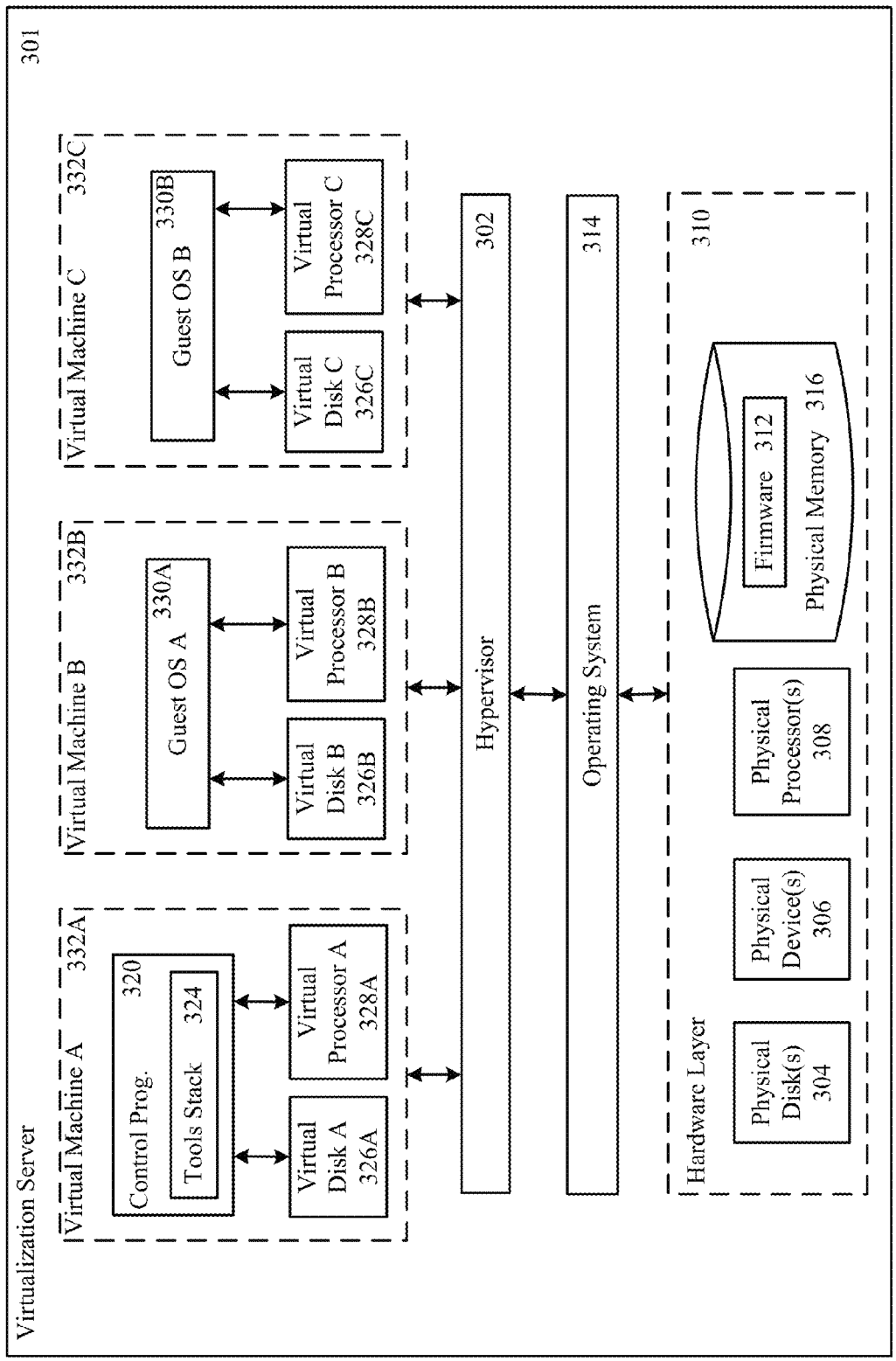
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer 310 that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, session 0 or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Device Management Services Virtualization System

Figure 4:
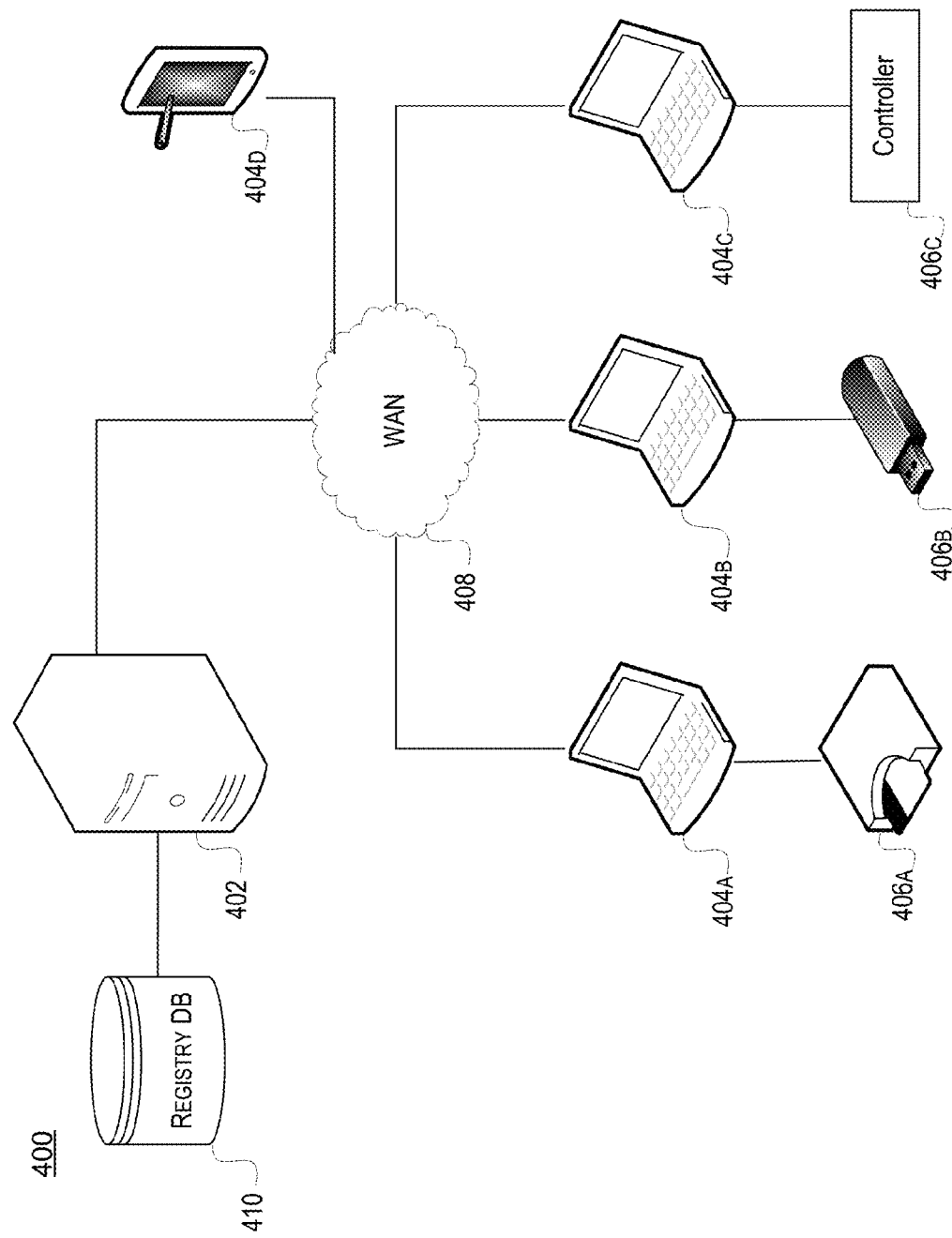
FIG. 4 depicts an illustrative system for implementing a multi-session environment in accordance with one or more illustrative aspects described herein.

FIG. 4 depicts an illustrative computing system 400 in accordance with one or more illustrative aspects described herein. As shown in FIG. 4, computing system 400 may include a remote server 402 connected to multiple client devices 404A-C (generally 404) via a wide area network 408 (e.g., Internet, intranet, and/or a combination thereof). Client device 404 may be any type of computing device such as, for example, a personal computer, server, thin-client, tablet, smartphone, or the like, and include one or more components of network nodes 103 or computing device 201. Service managed devices 406A-C (generally 406) may be operatively connected with client device 404 via wired (e.g., through a universal serial bus port such as a USB-C port) or wireless connections (e.g., Bluetooth, Wi-Fi, etc.). Service managed devices 406 may include, for example, smartcards 406A, USB-based devices 406B, controllers 406C (e.g., gaming controller, remote control, etc.), or the like. A client device 404D may be considered a service managed device in instances where the client device 404 is managed and controlled by a device management service. As an example, a tablet or printer may have a corresponding service that manages operation of the device.

Remote server 402 may provide a virtual application delivery solution to client devices 404. Virtual application delivery solutions provide application virtualization so that users of client devices 404 may remotely access and interact with one or more applications that are executed entirely on remote server 402 using inputs received from the client devices 404. In such a virtual application delivery solution, remote server 402 may only execute a single operating system for use with multiple sessions and multiple applications within each session. That is, remote server 402 might not virtualize one or more instances of the server's operating system since creating a virtualized operating system for each session is costly and involves a vast amount of disk space. In some embodiments, the applications believe they are interfacing with the operating system installed on remote server 402 directly when, in fact, they are interfacing with an application virtualization layer (not shown) that acts as a proxy to the operating system of remote server 402. In some embodiments, computing system 400 might not include a hypervisor.

Remote server 402 may also include and/or be communicatively coupled with a global registry database 410 that is accessible by each session. Device management services are designed to write information to and read information from global registry database 410 under the assumption that service managed devices 406 are operating in a single session environment.

In one or more arrangements, remote server 402 may include a session manager that performs a number of tasks. Session manager may provide a session interface that permits third party vendors or partners to register their device management services with the session manager and/or application virtualization services (e.g., XenApp developed by Citrix Systems, Inc.) using a registration software development kit (SDK). The third party vendors or partners may register the device management services in a virtual session host (VSH) services database for use by the session manager. During registration, policies for use of the device management services in a multi-session environment may be created. One policy may include for the session manager to, upon startup of an instance, generate a virtualized instance of the device management services for use in that session so that each session has its own virtualized instance of the device management service. Further, another policy may include when to virtualize a resource. Yet another policy may include when and/or where to reroute a specified command (e.g., a write command to global registry database 410). Still yet another policy may include allocating one or more memory locations (e.g., files) of remote server 402 or a database communicatively coupled to remote server 402 that are to be allocated for use by their service managed devices 406 and/or their device management services. During startup of a session, the session manager may, based on the specified one or more memory locations of registry database 410, allocate memory locations for use with a specific session being created and to which commands from service managed devices 406 and/or their device management services may be routed. Further, the session manager may create a mapping of virtual resources and/or memory locations in registry database 410 to the memory locations specific to the sessions (e.g., session-specific database 606 discussed below in FIG. 6). The registration SDK may provide various options to include access permissions and levels for device management services. The device management service may expose a standard interface so that it is notified of various events (e.g., startup, shutdown, session events, etc.). The SDK may also enable administrators to monitor and control the behavior of each session-specific instance of the device management service.

Service managed devices 406 may be managed by device management services that provide an interface for and/or instructions for interacting with an operating system. The device management services enable applications, being executed in conjunction with the operating system, to access hardware functions of the service managed devices 406. For example, a device management service may be in the form of a device driver for use with a particular service managed device 406. When an operating system or application instructs the particular service managed device 406 to perform a particular function by issuing a command, the service managed device's 406 corresponding device management service may intercept the command, translate the command into a form (e.g., format) understandable by the particular service managed device 406, and send the translated command to particular service managed device 406 for execution. Similarly, any output of the particular service managed device 406 intended for receipt by the application or the operating system may be intercepted and translated into a form understandable by the application prior to being received by the application or the operating system. Thus, the device management service enables an application to communicate with the particular service managed device 406 without having precise knowledge of the specific hardware or software command policies of the service managed device 406.

Users may connect service managed devices 406 with their client devices 404 for use with a virtualized application provided by remote server 402. As an example, a user may connect smartcard 406A via a smartcard reader to client device 404A for use with a virtual application provided by remote server 402. The service (e.g., driver for a particular type of smartcard or smartcard reader) may have been designed under the assumption that smartcard 406A or its smartcard reader will be utilized in a single-session or single-user environment, which may lead to a number of problems.

One problem may occur when one virtual instance of an application in one session overwrites data stored by another virtual instance of the application in a different session. As an example, the device management service (e.g., a device driver) for the smartcard 406A may instruct an instance of an application to write information to (or read information from) a particular memory location (e.g., a particular file) of global registry database 410, client device 404, and/or smartcard 406A. However, the device management service might not account for multiple instances of the same application corresponding to different sessions where each instance of the application may initiate such commands (e.g., a write command, a read command, etc.) to the same global registry database 410. As a result, the device management service may instruct one instance of the application in a first session to write information a particular memory location of global registry database 410 and may also inappropriately instruct another instance of the application in a second (e.g., different) session to write information to the same memory location of global registry database 410 resulting in a loss of the information overwritten by the subsequent write instruction.

Further, the inappropriate overwrite of data by one instance of an application in one session may result in reading incorrect data by another instance of the application in a different session. Following the above example, after the instance of the application in the second session has written information to the particular memory location of global registry database 410 thereby inappropriately overwriting information previously written to the particular memory location of global registry database 410 by the instance of the application in the first session, the instance of the application in the first session may read the information stored in the particular memory location of global registry database 410, which is now inaccurate with respect to the instance of the application in the first session as a result of the inappropriate overwrite. Exacerbating the problem, the instance of the application in the first session might not be aware that the information read from the memory location of global registry database 410 is inaccurate with respect to the instance of the application in the first session.

However, as briefly described here and will be described in further detail below, remote server 402 may create multiple virtualized instances of the device management service (e.g., the device driver for smartcard 406A) as well as utilize a redirection layer to appropriately route write instructions, read instructions, or other instructions to an appropriate destination so as to maintain boundaries between each session in a multi-session environment. Accordingly, following the above example, information might not be overwritten by an application being executed in a different session, which remedies the above-described problems.

In a typical setup of a multi-session environment, which would lead to above-described problems, device management services for service managed devices were executed in the same session as system services (e.g., session 0). Further, if a multi-session environment successfully enforced session boundaries, then the device management services might not be able to access the service managed devices in a different session. However, the setup of the multi-session environment 500 shown in FIG. 5 remedies these issues.

Figure 5:
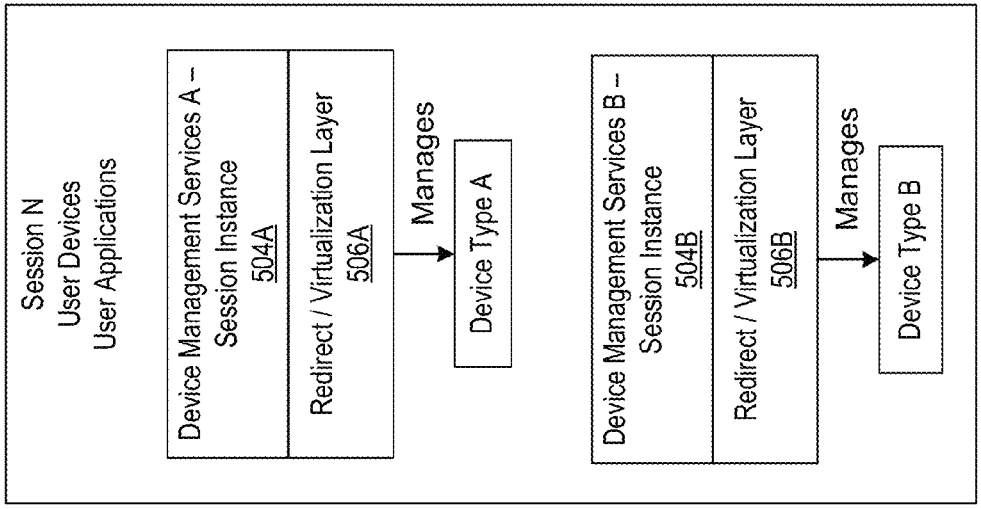
FIG. 5 depicts an illustrative session view of a multi-session environment in accordance with one or more illustrative aspects described herein.
Figure 5:
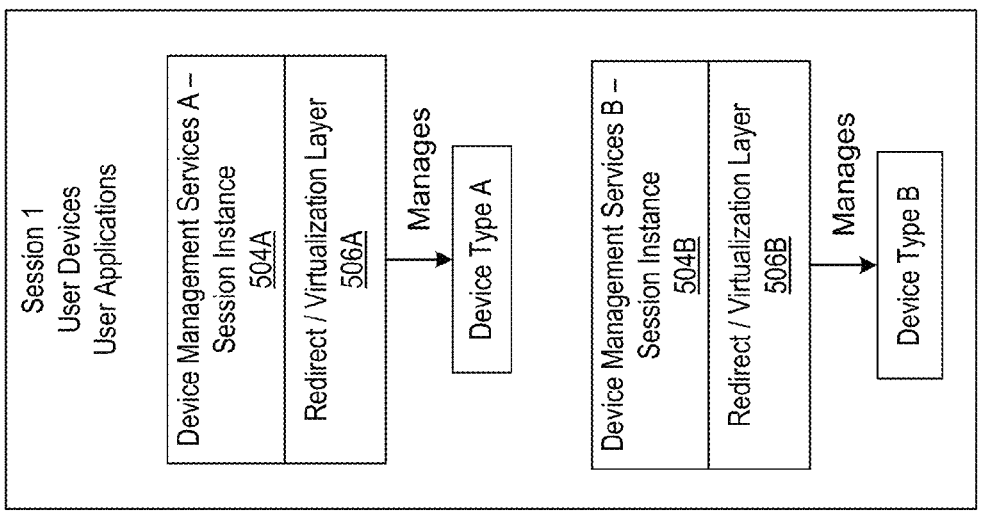
Figure 5:
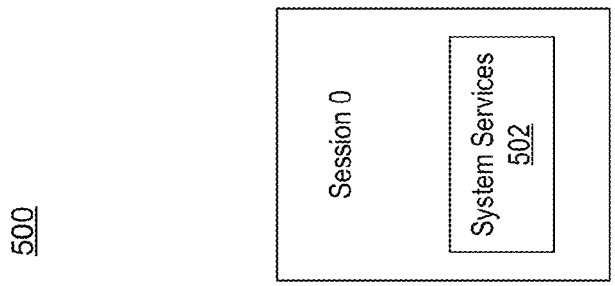

FIG. 5 depicts an illustrative session view of a multi-session environment 500 in accordance with one or more illustrative aspects described herein. A multi-session environment 500 may include multiple different sessions (e.g., session 0, session 1 . . . session N). As shown in FIG. 5, each session may depict the relationship between virtualized device management services and corresponding devices managed by such services. One session (e.g., session 0) may be specific to system services, which may include the single operating system for remote server 402 and serves as an administrator. Virtualized instances of system services such as the operating system might not be generated and there might not be a hypervisor. Although session 0 may include the system services, it might not include the device management services (or virtualized instances thereof) for managing the service managed devices 406.

For each service managed device 406 that is to be used in a particular session, a virtualized session instance 504 of its management services (e.g., its device driver) and a corresponding redirect/virtualization layer 506 may be created by the session manager for management of the device type 506 of the service managed device 406 within the session. As a result, sessions (e.g., session 1 . . . session N) may each include a session instance 504 of a device management service (e.g., a virtualized instance of a device driver) for use with that session to manage a particular device type. Further, session manager may generate a redirect/virtualization layer 506 for each instance to aid the instance 506 of the device management service in managing the device type. For example, session 1 may include a session instance 504A of device management service A and a redirection virtual layer 506A to manage device type A (e.g., a smartcard type for smartcard 406A). Session 1 may also include a session instance 504B of device management service B and a redirection virtual layer 506B to manage device type B (e.g., a USB device type for USB-based device 406B). Similarly, session N may include another session instance 504A of device management service A and a redirection virtual layer 506A to manage device type A (e.g., a smartcard type for smartcard 406A). Session N may also include a session instance 504B of device management service B and a redirection virtual layer 506B to manage device type B (e.g., a USB device type for USB-based device 406B).

Although two instances 504 of device management services and redirect/virtualization layers 506 are shown for two device types A and B in FIG. 5, more or less than two device management services 504 and redirect/virtualization layers 506 may be utilized, which may correspond to the number of different device types being utilized in that session.

Figure 6:
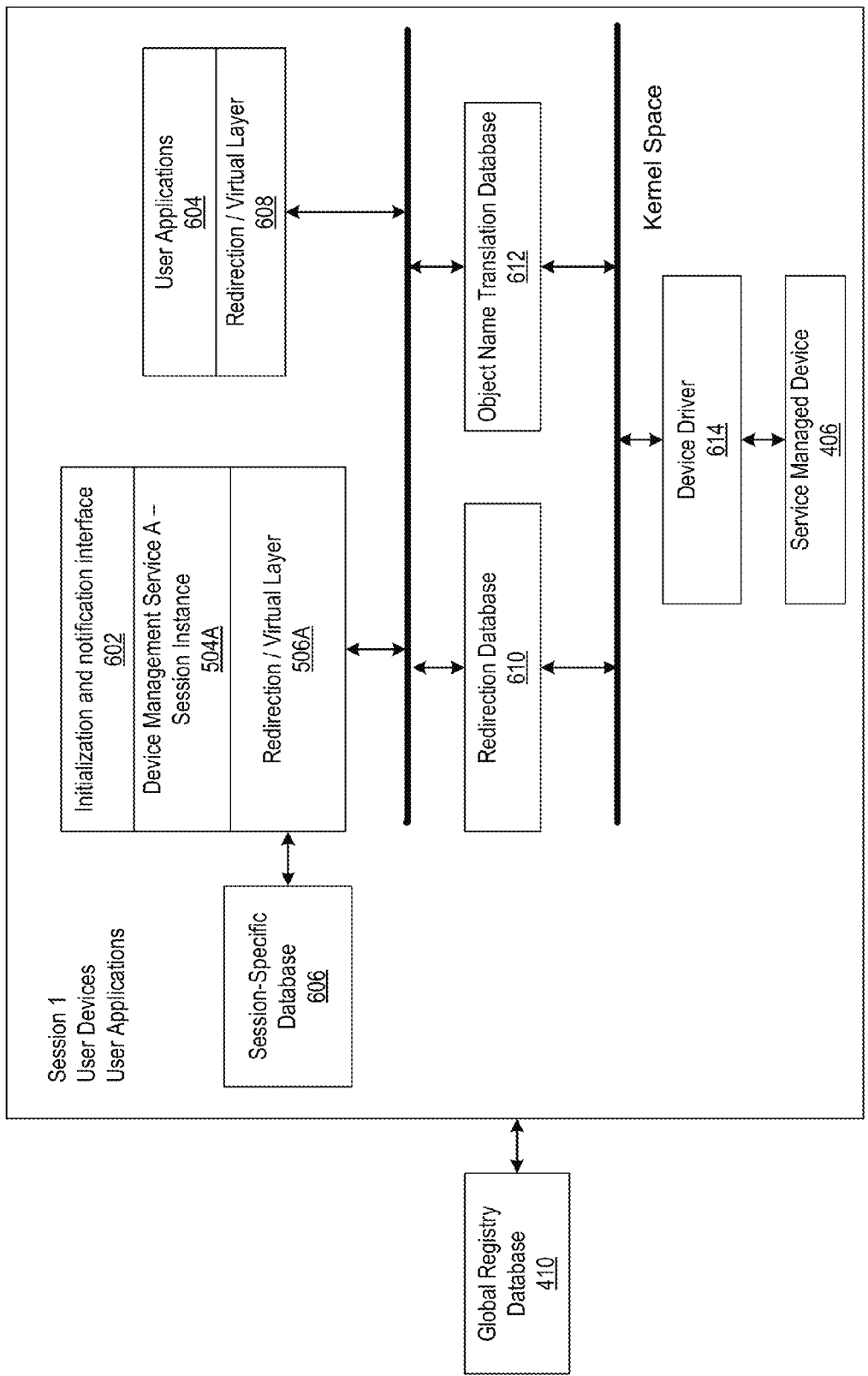
FIG. 6 depicts an exploded block diagram view of a portion of session 1 for a particular service managed device, in accordance to one or more illustrative aspects herein.

FIG. 6 depicts an exploded block diagram view of a portion of session 1 for a particular service managed device, in accordance to one or more illustrative aspects herein. During creation of a new session, the session manager may use a startup process to create a virtual service host process container, which may host various device management services. During the startup process, the session manager may create an initialization and notification interface 602 to interface with the client/server runtime subsystem (CRSS) for the windows and graphics subsystem and authentication subsystems (e.g., Winlogon, LogonUI). Additionally, initialization and notification interface 602 may provide initialization and shutdown interfaces for session instance 504A of device management service A. As a result, session instance 504A of device management service A may begin its device-specific monitoring when the startup process is invoked. Session instance 504A of device management service A may also handle shutdown and restart notifications accordingly. Further, initialization and notification interface 602 may permit session instance 504A of device management service A to receive the hosting session-specific notifications (e.g., lock, unlock, logon, pre-logoff, etc.). Further, during the startup process, the session manager may also create any other startup processes that are associated with pre-registered third party services and load the processes with the virtual service host process. For instance, the session manager may create a new process that will host the pre-configured device management services in each session created by remote server 402.

When one or more of the virtualized user applications 604 wish to access functionality of service managed device 406. Redirection virtual layer 608 may reroute communications (e.g., a command or instruction) from the application and intended for the service managed device 406 to a session instance 504A of device management service A, which may then reformat and/or otherwise transform the communication into a format understandable by the service managed device 406. Session instance 504A of device management service A may then send the transformed communication to service managed device 406. In response, service managed device 406 may perform a function instructed by the transformed communication. As an example, in the case where service managed device 406 is smartcard 406A, the smartcard 406A may retrieve the user's authentication credentials or perform some other function. Service managed device 406 may send a responsive communication to the application, if appropriate. However, redirection virtual layer 608 may reroute the communication to session instance 504A of device management service A, which may then reformat and/or otherwise transform the responsive communication into a format understandable by the application.

Redirection virtual layer 506A may intercept and inspect each communication sent to and from session instance 504A of device management service A. If a communication meets a predetermined criterion, a redirection virtual layer may perform an action (e.g., the communication may be rerouted and/or a particular resource may be virtualized). The predetermined criterion may be set during the registration of a device management service by the third party or another entity.

In some instances, the predetermined criterion may be a whether the communication includes a references to a global object/resource (e.g., an object or resource not specific to a session). In such instances, redirection virtual layer 506A may redirect communications associated with a session and for a global resource to access a virtual instance of the global resource that is specific to the session. For example, redirection virtual layer 506A may determine whether a virtual instance of the global resource for use with the session exists in redirection database 610 and/or session-specific database 606. If not, redirection virtual layer 506A may generate a virtual instance of the global resource for use with the session, store the virtual instance of the global instance of the global resource in one or more of redirection database 610 and/or session-specific database 606, and update a mapping stored in redirection database 610 to include the correspondence between the global resource and the virtual instance of the global resource. Redirection virtual layer 506A may also direct the communication to access the virtual instance of the global resource that is specific to the session rather than access the global resource itself. Otherwise, if redirection virtual layer 506A determines that the virtual instance of the global resource for use with the session exists by consulting the mapping stored in redirection database 610, redirection virtual layer 506A may use the mapping to direct the communication to access the virtual instance of the global resource that is specific to the session rather than access the global resource itself.

In many examples discussed herein, the predetermined criterion may be a write or read command to a particular file or memory location. As an example, if a communication is a write command or a read command to a resource (e.g., a memory location) in global registry database 410 allocated for service managed device 406 and/or global device-specific information in global registry database 410, redirect virtualization layer 506A may redirect those commands to a session-specific database 606 and such commands might not be sent to global registry database 410. Each session (e.g., session 1 . . . session N) may be associated with its own session-specific database 606, which may be a logical memory partition of remote server 402 for use with registry database redirection.

Redirection virtual layer 506A may consult redirection database 610, which may store routing policies (e.g., a mapping of memory locations in registry database 410 to memory locations in session-specific database 606). Using the mapping, redirection virtual layer 506A and/or the session manager may retrieve the intended memory location of global registry database 410 from the write command or the read command, and determine the memory location of session-specific database 606 that corresponds to the memory location of global registry database 410. Redirection virtual layer 506A may then reroute the write command or the read command such that the write command or the read command writes information to or reads information from the corresponding memory location of session-specific database 606 rather than from the originally-specified memory location of global registry database 410. As an example, for a write command, instead of writing the information to file A of global registry database 410, the information may be written to file A of session-specific database 606, which has been allocated for use with service managed device 406. As another example, for a read command, instead of reading the information from file A in global registry database 410, the information may be read from file A in session-specific database 606.

As a result of the redirection of write commands and read commands from global registry database 410 (accessible by each session) to session-specific database 606 (accessible by only its corresponding session), one instance of a service running in a specific session might not be able to modify resources of another instance of the service running in another session when both sessions are using the same type of service managed device 406. By utilizing the redirection, the above example regarding the inappropriate overwrite of information to global registry database 410 by one instance of a service resulting in inaccurate reading of information from global registry database 410 by another instance may be avoided.

Additionally, in one or more arrangements, redirection virtual layer 506A may determine that the intended memory location in global registry database 410 does not have a corresponding memory location in session-specific database 606 based on the mapping. When there is not a corresponding memory location in specific-database 606 and when the communication is to a global/shared system resource (e.g., a memory location of global registry database 410), redirection virtual layer 506A may be configured via one or more policies to virtualize the resource and/or allocate memory in session-specific database 606 to correspond to the intended memory location in global registry database 410, redirect the communication to the newly allocated memory location in session-specific database 606, and update the mapping to reflect the new correspondence.

In the event the communication is a read command and session-specific database 606 does not have information stored at the memory-location to which the read command was redirected by redirection virtual layer 506A, redirection layer 506A may again redirect the read command to the global registry database 410 (e.g., the original memory location of global registry database 410 indicated in the read command). In such a case, the session manager may store in the session-specific database 606 the memory location of the global registry database 410 of the read command for later reference by device management services and applications. Additionally or alternatively, in some embodiments, rather than routing the read command to read the from the memory locations of global registry database 410, the session manager may populate one or more corresponding memory locations of session-specific database 606 with default values during the startup process. In one or more arrangements, the default values for one or more memory locations of session-specific database 606 may be preset by the user, an administrator, and/or by session instance 504A of the device management service A. In one or more additional or alternative arrangements, the default values may be values currently stored in corresponding memory locations of global registry database 410. As a result, the values stored in the corresponding memory locations of session-specific database 606 will match the values stored in the memory location of global registry database 410 allocated for use with service managed device 406 or its device manage service A.

In some embodiments, during registration of a device management service, the third party and/or another entity may create an indication of which global resources or memory locations should be allocated session-specific virtualized resources and/or session-specific memory locations in a mapping stored in redirection database 610. In such embodiments, during the startup process (e.g., during session creation), the session manager may consult redirection database 610 to determine which resource and/or global memory locations (e.g., memory locations of registry database 410) should have corresponding virtualized resources and corresponding memory locations allocated for service managed device 406 or its device manage service A for use in a particular session.

Redirection virtual layer 506A may also serve as an object name translation layer. In one or more alternative arrangements, the object name translation layer may be a separate layer from redirection virtual layer 506A. The object name translation layer may use an object name translation database 612 (also referred to herein as translation database 612), which may store name translation policies, to provide session-specific object name resolution.

Because device management services such as device management service A were designed for a single session environment, such services may use global object names (e.g., object names that are not specific to a particular session such as session 1). As a result, in order to adapt the device management services for the multi-session environment, global object names may be changed to session-specific object names. A mapping of the global object names to session-specific object names may be stored in an object name translation database 612, which may be allocated and populated during the startup process (e.g., during session creation). In some instances, a taxonomy for the session-specific object names for the device management may be specified during registration of device management service.

With reference to session 1 shown in FIG. 6, redirection virtual layer 506A may inspect communications to and from session instance 504A of device management service A to determine whether the communications contain a global object name (e.g., an object name that is not specific to a particular session). Redirection virtual layer 506A may determine whether the communication includes a global object name by consulting a list of global object names stored in object name translation database 612. If so, redirection virtual layer 506A may look up the session-specific object name for each global object name in object name translation database 612 and replace, in the communication, the global object names with session-specific object names.

Similarly, redirection virtual layer 608 may inspect communication to and from user applications 604 to determine whether the communication contains a global object name (e.g., an object name that is not specific to a session such as session 1) and may replace, in the communications, global object names with session-specific object names that may indicate the session for the object. As an example, a global object name of "Foo" may be replaced with session-specific object name "Foo.Session1" to indicate that the object is specific to session 1. By renaming global object names of a system to session-specific object names, session instance 504A of device management service A may communicate using the session-specific object names to ensure session boundaries are maintained and/or otherwise not crossed by other sessions. The third party vendors or partners may specify the session-specific naming convention for use with the sessions so that the device management services may both in workstation and multi-session platforms without any modifications. As a result, third party vendors and partners may focus on a unified service model and not spend much effort and time in modifying the device management service for workstation and multi-session platforms.

In some embodiments, redirection database 610 and/or redirection layer 608 may redirect communications for files by renaming global object names to session-specific object names.

In some embodiments and as shown in FIG. 6, a session (e.g., session 1) may include the device driver 614 that is associated with the session instance 504a of device management service A, and is in communication with service managed device 406. Device driver 614 may reside in the kernel space of remote server 402 and/or a client device 404. In some instances, device driver 614 may be part of the operating system executed on remote server 402. In other instances, device driver 614 may be independent (e.g., not a part) of the operating system executed on remote server 402 and may be supplied by a third party vendor. In such instances, the session instance 504a of device management service A may be executed in a user mode while the actual driver (e.g., device driver 614) performing the device function may be executed in the kernel space of remote server 402.

Although the discussion above in connection with FIG. 6 is with reference to one service managed device and its corresponding device management service, the session may include a second service managed device and its corresponding device management service. The session may operate in a similar manner with respect to the second service managed device and its corresponding device management service. Further, a different session corresponding to a different user may include one or more service managed devices and their corresponding device management services, and may operate in a similar manner as discussed above in connection with FIG. 6.

Figure 7:
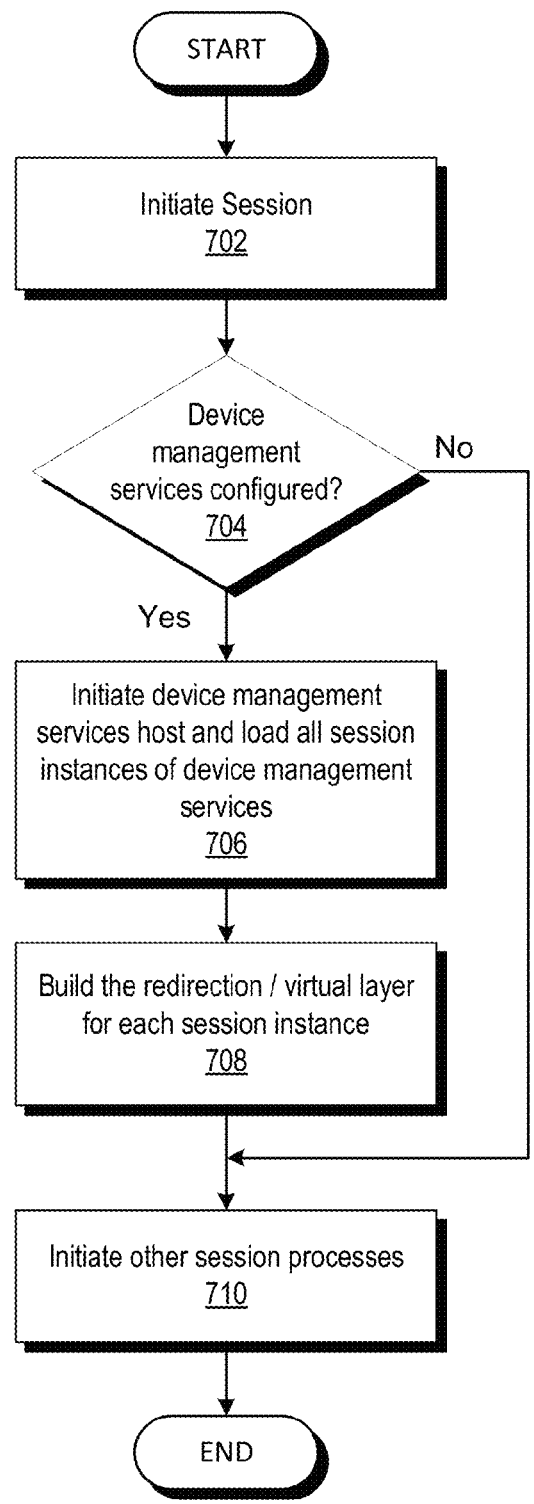
FIG. 7 depicts an illustrative flow of session startup and loading of the virtualized device management service, in accordance with one or more illustrative aspects discussed herein.

FIG. 7 depicts an illustrative flow of session startup and loading of the virtualized device management service, in accordance with one or more illustrative aspects discussed herein. In one or more embodiments, the steps of FIG. 7 and/or one or more steps thereof may be performed by one or more computing devices. In other embodiments, the method illustrated in FIG. 7 and/or one or more steps thereof may be embodied in computer-executable instructions that are stored in a computer-readable medium, such as a non-transitory computer-readable memory. In some instances, one or more of the steps of FIG. 7 may be performed in a different order. In some instances, one or more of the steps of FIG. 7 may be omitted and/or otherwise not performed.

The method may begin at step 702 in which remote server 402 may initiate and/or otherwise create a session, via a startup process, in a multi-session virtualized environment. As an example, a user at client device 404A may wish to remotely access applications executed on remote server 402. The user may login into a portal to access the virtualized application services provided by remote server 402. Remote server 402, in response to receiving the user's authentication credentials, may authenticate the user and, if the user is authenticated, initiate a session for that user in the multi-session environment managed by remote server 402. If the user's authentication credentials are not authenticated, remote server 402 may send a message indicating that the user is not authenticated to client device 404A for display to the user.

If the user has been authenticated, remote server 402 may, at step 704, identify service managed devices connected to the user's client device and determine whether each corresponding device management service has been pre-configured (e.g., registered and/or otherwise setup prior to creating this session). Third party entities may register and/or otherwise configure their device management services for use in a multi-session environment. For instance, during configuration of a device management service, one or more routing policies (e.g., mapping of memory locations, files, databases, etc.) and file or object name translation policies may be determined (e.g., selected by the third party) for later use by redirection virtual layers. If the device management service has not been pre-configured, then remote server 402 might not be able to adequately redirect communications (e.g., write commands, read commands, etc.) to a session-specific database and/or translate global object names to session-specific object names and, as a result, might not lead to overwrite and inaccurate read problems discussed above. For each device management services associated with service managed devices connected to the user's client device that have not been preconfigured to permit creation of one or more of virtualized instances of the device management service, routing policies, and/or renaming policies, remote server 402 may proceed to step 710 and start other session processes (e.g., other processes to setup a session for the user). Further, a warning message may be transmitted from remote server 402 to the user's client device 4064 for display to the user. The warning message may indicate that the service managed devices 406 connected to the user's client device 404 that might not function properly and may display inaccurate information. Additionally, remote server 402 might prevent write commands to global registry database 410 that are from un-registered and/or non-configured device management services to ensure that the information stored in global registry database 410 remains accurate with respect to other sessions of the multi-session environment.

For each device management services associated with service managed devices connected to the user's client device that have been preconfigured to permit creation of one or more of virtualized instances of the device management service, routing policies, and/or renaming policies, remote server 402 may, at step 706, initialize a device management services host and load virtualized session instances of the one or more pre-configured device management services. For example, remote server 402 may, in session 1, create a session instance 504A of device management service A and a session instance 504B of device management service B. The virtualized session instance of a device management service may include all of the functionality of the device management service.

At step 708, remote server 402 may build the redirection virtual layers (e.g., redirection virtual layers 506, 608) for each session instance of a device management service created in step 706. In one or more arrangements, during registration and/or configuration of the device management service, remote server 402 may determine and/or otherwise receive routing policies and name translation policies from the device management service or its associated third party entity. Remote server 402 may then use such policies to configure the redirection virtual layers. Further, remote server 402 may generate session-specific database 606, redirection database 610 and/or object name translation database 612 if not already generated.

At step 710, remote server 402 may initiate other session process for creating the user's session in the multi-session environment. For example, remote server 402 may create virtualized instances of the user's applications for use by the user's client device.

Figure 8:
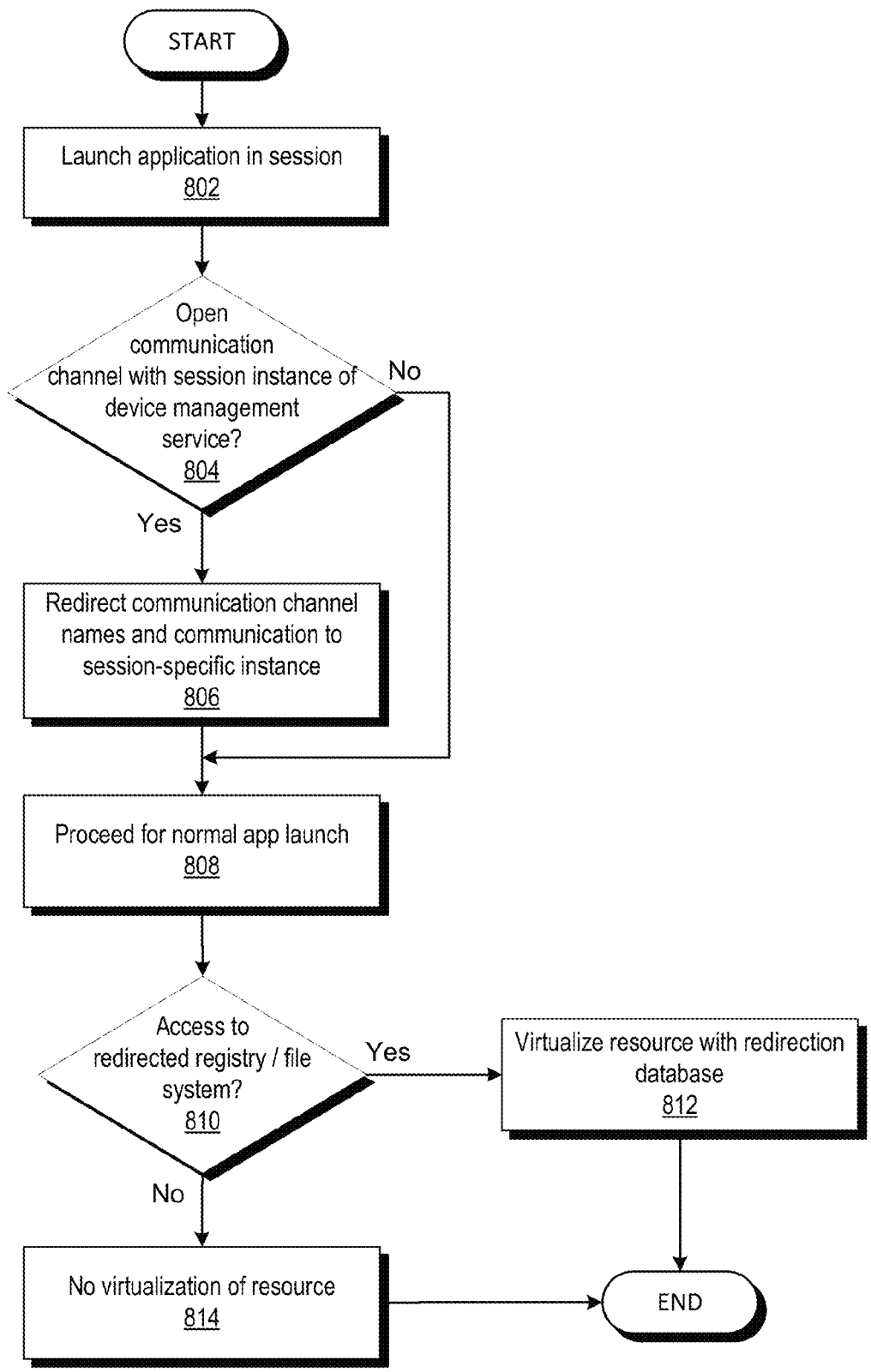
FIG. 8 depicts an illustrative flow of launching an application and using the application with a service managed device, in accordance with one or more illustrative aspects discussed herein.

FIG. 8 depicts an illustrative flow of launching an application and using the application with a service managed device, in accordance with one or more illustrative aspects discussed herein. In one or more embodiments, the steps of FIG. 8 and/or one or more steps thereof may be performed by one or more computing devices. In other embodiments, the method illustrated in FIG. 8 and/or one or more steps thereof may be embodied in computer-executable instructions that are stored in a computer-readable medium, such as a non-transitory computer-readable memory. In some instances, one or more of the steps of FIG. 8 may be performed in a different order. In some instances, one or more of the steps of FIG. 8 may be omitted and/or otherwise not performed.

The flow may begin at step 802 in which remote server 402 may launch a virtualized instance of an application in a session of a multi-session environment. For example, remote server 402 may create a virtualized session-specific instance of an application for use in one session. The instance may include all of the functionality of the application, and may be executed by remote server 402 using inputs provided by the user's client device 404. Outputs may be sent to the client device 404 for display to the user.

At step 804, remote server 402 may determine whether there is an open communication channel between one or more (e.g., each) of the virtualized application instances of the applications and one or more (e.g., each) of the virtualized session instance of the device management services. For instance, there may be an open communication channel if a communication is transmitted between at least one of the virtualized session instances of the device management services and at least one of the virtualized application instances within the same session. If there is not an open communication channel, the process may proceed to step 808 discussed in detail below. Otherwise, if there is an open communication channel (e.g., a communication is being transmitted between a virtualized session instance of a device management service and a virtualized application instance), redirection virtual layer may intercept and inspect the communication to identify references to global resources such as non-session-specific memory locations, files, registry database 410, etc., and also identify global object names (e.g., system object names, operating system object names, etc.).

At step 806, the redirection virtual layer may perform communication redirection and/or system object name translation for each of the references to global resources such as non-session-specific memory locations, files, registry database 410, etc., and also the global object names (e.g., system object names, operating system object names), identified in step 804.

As an example, the communication from the application (or, alternatively, from the session instance of the device management service) may be a write command to global registry database 410, file, or other memory location that is not specific to any session. Redirection virtual server 506 may determine whether there is a corresponding memory-location or file specific to the session associated with the communication by consulting redirection database 610. If there is not a session-specific database (e.g., session-specific database 606), redirection virtual layer 506 may create session-specific database 606, which may be a memory partition of remote server 402. Once created or if session-database 606 already existed but did not have a memory location or file mapped to the memory-location or file of global registry database 410 specified in the write command, redirection virtual layer 506 may allocate a memory location or file in session-specific database 606, map the memory location or file of global registry database 410 to the memory location or file of session-specific database 606, and update a mapping for the session stored in redirection database 610. Further, the write command may be redirected to write its information to the memory-location or file of session-specific database 606, and might not write its information to the intended memory-location or file of global registry database 410.

As another example, the communication from the application (or, alternatively, from the session instance of the device management service) may be a read command from global registry database 410, file, or other memory location that is not specific to any session. Redirection virtual server 506 may determine whether there is a corresponding memory-location or file specific to the session associated with the communication by consulting redirection database 610. If there is not a session-specific database (e.g., session-specific database 606) or if session-specific database 606 does not have a memory location or file mapped to the intended memory location or file of global registry database, redirection virtual layer may permit the read command to read from global registry database 410, file, or other memory location that is not specific to any session. Otherwise, if there is a memory-location or file in session-specific database 606 mapped to the intended memory-location or file of global registry database 410, redirection virtual layer 506 may redirect the read command to read the information stored in the memory-location or file in session-specific database 606 rather than from the intended memory-location or file of global registry database 410.

As yet another example, redirection virtual layer 506, 608 may, for any references to global system object names that are not specific to any session, rename the reference in the communication with its corresponding session-specific object name found in object name translation database 612. For example, the global object name "Foo" may be renamed to "Foo.Session1" for session 1 and to "Foo.Session2" for session 2.

At step 808, remote server 402 may proceed to normal application launch. For instance, a user may interact with the virtualized instance of the application via the user's client device. The functions of the virtualized instance of the application may be executed by remote server 402.

At step 810, redirection virtual layer 506, 608 may determine whether the virtual application instance is attempting to access and/or has access to session-specific database 606, which may include a redirected registry and/or a redirected file system. If so, redirection virtual layer 506, 608 may, in step 812, create a virtualized session-specific instance of the global system object and store it in session-specific database 606 unless the virtualized session-specific instance of the global system object has already been created and stored in session-specific database 606. Further, redirection virtual layer 506, 608 may update a mapping for the session stored in redirection database 610 to include the location of the virtualized session-specific instance of the global system object and its correspondence to the global system object. As a result, the application instance may access and use the virtualized session-specific instance of the global system object with retrieving data from the service managed device. Additionally, when redirection virtual layer 506, 608 intercepts subsequent communications for the global system object, global system object may use the redirection database 610 to determine whether the global system object has a corresponding virtualized session-specific instance of the global system object and, if so, may be directed to use the virtualized session-specific instance of the global system object. Other sessions might not access the virtualized session-specific instance of the global system object. Otherwise, if the application instances is not attempting and/or does not have access to session-specific database 606, global system object might not be virtualized in step 814.

In some instances, at steps 804 and/or 806, the redirection virtual layer may virtualize communication channels between session instances of the applications and device management services. Additionally, at steps 810 and/or 812, the redirection virtual layer may virtualize various types of resources for use by session instances of the applications and device management services.

In some embodiments, the redirection virtual layer may perform file system translation. For instance, the location to which a redirection virtual layer routes a message associated with a session may depend on whether a write request associated with request and for the location has already been received. Each write request associated with a session for a location of a global registry database 410 including the first or initial write request may be redirected to a location of the session-specific directory 606 corresponding to the location of the global registry database 410 and update the mapping stored in redirection database 610 to reflect the correspondence. Read requests from files will continue to be from original file until an attempt is made to change the access and/or contents of files (e.g., via a write request). For read requests opened after a write access, file will automatically be redirected to session specific silo (e.g., session-specific directory 606). As an example, the redirection virtual layer may, in response to receiving a read request for a location of the global registry database 410, determine whether there has been a previously intercepted write access associated with the session to the location of the global registry database 410 by using the mapping stored in redirection database 610. If so, the redirection virtual layer may reroute the read request to a location of session-specific database 606 and corresponding to the location of the global registry database 410 to read the information. Otherwise, if there has not been a previous write access associated with the session to the location of the global registry database 410, the redirection virtual layer may route the read request to the location of the global registry database 410 to read the information.

As used herein, when a component in a session (e.g., redirection virtual layer) is said to be performing a function, remote server 402 may be performing the function.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system comprising:
a first computing device configured to provide a virtual environment comprising a plurality of sessions where each session is specific to a different user and comprises at least one virtual instance of an application executed by the first computing device; and
a second computing device communicatively coupled to the first computing device via a wide area network, the second computing device being associated with a session, of the plurality of sessions, and configured to interact with a virtual instance of the application specific to the session,
wherein the second computing device is communicatively coupled to a service managed computing device configured to be managed by a device management service,
wherein the session comprises a virtual instance of the device management service for use with the session and a redirection layer for use with the session, and
wherein the redirection layer is configured to intercept a communication between the virtual instance of the application specific to the session and the virtual instance of the device management service for use with the session.

2. The system of claim 1, wherein the redirection layer is configured to:
in response to determining that the communication comprises a write instruction to a location of a global registry database, determine whether a location of a database specific to the session and corresponding to the location of the global registry database exists.

3. The system of claim 2, wherein the redirection layer is configured to:
in response to determining that the location of the database specific to the session and corresponding to the location of the global registry database does not exist, create the location of the database specific to the session and corresponding to the location of the global registry database and route the write instruction to the location of the database specific to the session and corresponding to the location of the global registry database.

4. The system of claim 2, wherein the redirection layer is configured to:
in response to determining that the location of the database specific to the session and corresponding to the location of the global registry database exists, route the write instruction to the location of the database specific to the session and corresponding to the location of the global registry database.

5. The system of claim 1, further comprising:
in response to determining that the communication comprises a read instruction to a location of a global registry database, determine whether the redirection layer has previously intercepted a write instruction to the location of the global registry database.

6. The system of claim 5, further comprising:
in response to determining that the redirection layer has previously intercepted the write instruction to the location of the global registry database, route the read instruction to a location of a database specific to the session where the write instruction was previously routed.

7. The system of claim 5, further comprising:
in response to determining that the redirection layer has not previously intercepted the write instruction to the location of the global registry database, route the read instruction to the location of the global registry database.

8. The system of claim 1, further comprising:
determine whether the communication comprises a global object name; and
in response to determining that the communication comprises the global object name, renaming the global object name with a name specific to the session and that is indicative of the session.

9. The system of claim 1,
wherein the system does not comprise a hypervisor and does not comprise virtual instances of an operating system, and
wherein the service managed device is a universal serial bus-enabled device and the device managed service is a device driver of the service managed device.

10. The system of claim 1, wherein the redirection layer is configured to:
in response to determining that the communication comprises a write instruction to a global resource, determine whether a virtual instance of the global resource that is specific to the session exists;
in response to determining that the virtual instance of the global resource that is specific to the session does not exist, generate the virtual instance of the global resource that is specific to the session; and
in response to determining that the virtual instance of the global resource that is specific to the session exists, access the virtual instance of the global resource that is specific to the session.

11. An apparatus comprising:
a processor; and
a computer readable medium storing instructions that, when executed by the processor, configure the apparatus to:
generate a plurality of sessions where each session is specific to a different user and comprises at least one virtual instance of an application;
perform one or more functions of a virtual instance of the application for a session, of the plurality of sessions, based on one or more user inputs received from a user device different from the apparatus;
determine whether the user device is connected to a peripheral device configured to be managed by a device driver; and
in response to determining that the user device is connected to the peripheral device configured to be managed by the device driver, generate a virtual instance of the device driver for the session and a redirection layer for the virtual instance of the device driver for the session.

12. The apparatus of claim 11, wherein the computer readable medium stores instructions that, when executed by the processor, further configure the apparatus to:
perform one or more functions of a different virtual instance of the application for a different session, of the plurality of sessions, based on one or more user inputs received from a different user device;
determine whether the different user device is connected to a different peripheral device configured to be managed by the device driver; and
in response to determining that the different user device is connected to the different peripheral device configured to be managed by the device driver, generate a different virtual instance of the device driver for the different session and a different redirection layer for the different virtual instance of the device driver for the different session.

13. The apparatus of claim 11, wherein the computer readable medium stores instructions that, when executed by the processor, further configure the apparatus to:
intercept a communication between the virtual instance of the device driver and the virtual instance of the application; and
in response to determining that the communication comprises a write instruction to a location of a global registry database, route the write instruction to a location of a database specific to the session and corresponding to the location of the global registry database.

14. The apparatus of claim 11, wherein the computer readable medium stores instructions that, when executed by the processor, further configure the apparatus to:
intercept a communication between the virtual instance of the device driver and the virtual instance of the application; and
in response to determining that the communication comprises a read instruction for a location of a global registry database, route the read instruction to a location of a database specific to the session and corresponding to the location of the global registry database.

15. The apparatus of claim 11, wherein the computer readable medium stores instructions that, when executed by the processor, further configure the apparatus to:
intercept a communication between the virtual instance of the device driver and the virtual instance of the application; and
in response to determining that the communication includes a reference to a global object:
generate a virtual instance of the global object that is specific to the session; and
modify the reference to the global object to a reference to the virtual instance of the global object that is specific to the session.

16. A method comprising:
generating, by a computing device, a plurality of sessions where each session is specific to a different user and comprises at least one virtual instance of an application;
performing, by the computing device, one or more functions of a virtual instance of the application for a session, of the plurality of sessions, based on one or more user inputs received from a user device different from the computing device;
in response to determining that the user device is connected to a peripheral device configured to be managed by a device driver, generate a virtual instance of the device driver for the session and a redirection layer for the virtual instance of the device driver for the session; and
rerouting messages associated with a session and intended for a global resource to a virtual instance of the global resource that is specific to the session.

17. The method of claim 16, wherein each of the plurality of sessions is in communication with a same operating system and is not in communication with a hypervisor.

18. The method of claim 16, further comprising:
renaming global object names in the messages to object names specific to the session.

19. The method of claim 16, wherein at least one of the messages associated with the session and intended for a global resource comprise a write instruction or a read instruction to a location of a global registry database.

20. The method of claim 16, further comprising:
intercepting a read instruction associated with the session;
determining that the read instruction associated with the session is for a location of a global registry database; and
in response to determining that a write instruction associated with the session and for the location of the global registry database has been previously rerouted to a location of a database specific to the session and corresponding to the location of the global registry database, routing the read instruction to the location of the database specific to the session and corresponding to the location of the global registry database.

* * * * *